(No Model.)
T. R. RINGWOOD.
CULTIVATOR.
No. 402,196. Patented Apr. 30, 1889.
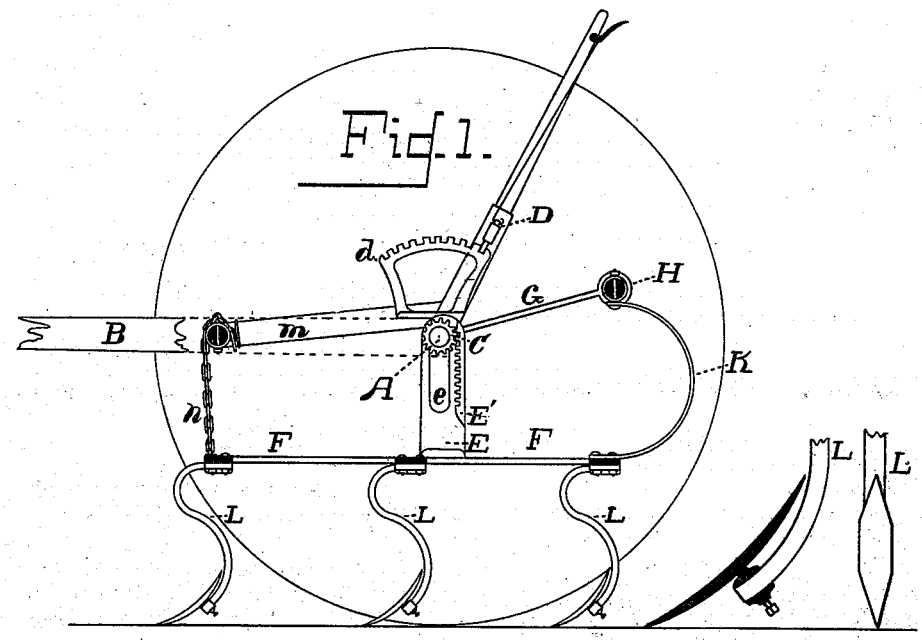
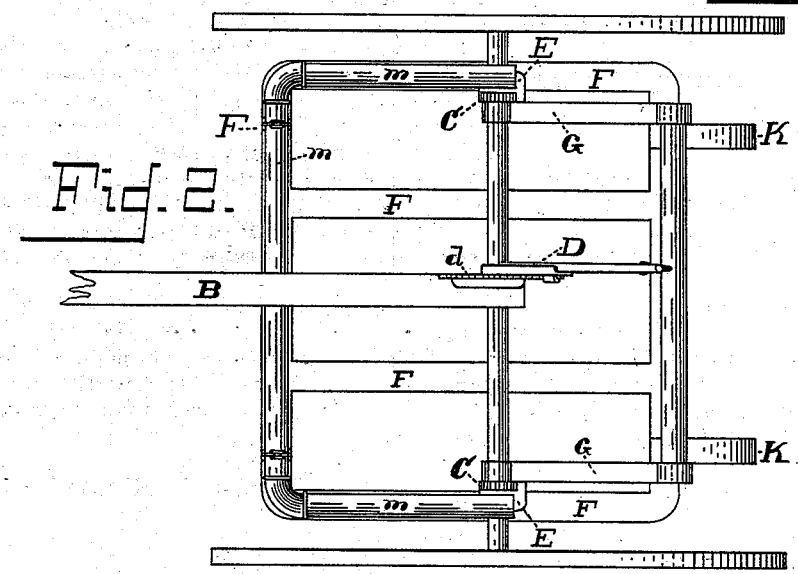
Witnesses,
L. E. Carpenter
George Underwood
Inventor
Thomas R. Ringwood.
by Frederick J. Allen
Attorney.

UNITED STATES PATENT OFFICE.

THOMAS R. RINGWOOD, OF SCIPIO, NEW YORK.

CULTIVATOR.

SPECIFICATION forming part of Letters Patent No. 402,196, dated April 30, 1889.

Application filed February 2, 1889. Serial No. 298,514. (No model.)

*To all whom it may concern:*

Be it known that I, THOMAS R. RINGWOOD, of the town of Scipio, county of Cayuga, and State of New York, have invented certain new and useful Improvements in Cultivators and Analogous Implements, of which the following is a description, reference being had to the accompanying drawings, forming part of this specification, in which—

Figure 1 is a side view; Fig. 2, a plan view, and Fig. 3 shows front and side views of the shovels.

In the drawings, A is the axle; B, the tongue. C C are pinions keyed to the axle.

D is a lever provided with a locking-segment, $d$.

E is a plate provided with an elongated opening, $e$, to encircle the axle, and with a rack, E′, which engages the pinion C.

F F is the frame, to which the shovels or teeth are secured, and this frame is secured to the plate E. Bars G are secured to the axle A, so as to turn with it, and are connected by a cross-bar, H, from which semicircular springs K extend downward and are connected to the rear of the frame F. An upper frame, $m\ m$, is secured to the axle and to the tongue, and chains $n\ n$ are secured thereto and are connected to the front part of the frame F F, and assist in supporting it.

L L are shovels or teeth secured to the frame-bars F F. A variety of points adapted to different uses may be used upon the teeth L L, of which one form is shown.

The operation of this machine is as follows: When the lever D, which is fixed upon the axle A, is drawn rearward, it revolves the axle and the pinions C C, and racks E′ E′ depress the frame F F, while the bars G G, being fixed to the axle, are also depressed, and, through the springs K K, act upon the rear of the frame F F and depress it at that point. The chains $n\ n$ may be let out to accommodate the different positions at which the frame F F is carried. When the lever D is moved in the forward direction, these movements are reversed and the frame F F is raised. The segment $d$ serves to secure the lever D at the desired point. By this construction the teeth L L may be raised or lowered or the frame F F rocked at will, while the springs K K transmit a yielding pressure to the rear of the frame.

Having thus described my invention, what I claim as new, and desire to secure by Letters Patent, is—

The combination of the frame F F, the standards E E, provided with racks E′ E′, the axle A, provided with the actuating-lever D, pinions C C, and bars G G, and the springs K K, connecting said bars with the rear of the frame F F.

THOMAS R. RINGWOOD.

Witnesses:
FREDERICK I. ALLEN,
GEORGE UNDERWOOD.